United States Patent [19]
Schnaibel et al.

[11] Patent Number: 5,241,857
[45] Date of Patent: Sep. 7, 1993

[54] METHOD FOR CORRECTING THE MEASURING ERRORS OF A HOT-FILM AIR-MASS METER

[75] Inventors: Eberhard Schnaibel, Hemmingen; Erich Junginger, Stuttgart; Klaus Hirschmann, Leonberg, all of Fed. Rep. of Germany

[73] Assignee: Robert Bosch GmbH, Stuttgart, Fed. Rep. of Germany

[21] Appl. No.: 828,974
[22] PCT Filed: Aug. 1, 1990
[86] PCT No.: PCT/DE90/00590
§ 371 Date: Apr. 1, 1992
§ 102(e) Date: Apr. 1, 1992
[87] PCT Pub. No.: WO91/02225
PCT Pub. Date: Feb. 21, 1991

[30] Foreign Application Priority Data
Aug. 1, 1989 [DE] Fed. Rep. of Germany ....... 3925377

[51] Int. Cl.$^5$ ........................................... G01M 15/00
[52] U.S. Cl. .................................................. 73/118.2
[58] Field of Search ............... 73/118.2; 123/478, 486, 123/488

[56] References Cited
U.S. PATENT DOCUMENTS
4,571,990 2/1986 Honig .................................. 73/118.2

FOREIGN PATENT DOCUMENTS
0065771 5/1982 European Pat. Off. .
0154509 2/1985 European Pat. Off. .
0339638 4/1989 European Pat. Off. .
0347218 6/1989 European Pat. Off. .
006130 7/1982 Japan .
2159983 4/1985 United Kingdom .

Primary Examiner—Jerry W. Myracle
Attorney, Agent, or Firm—Kenyon & Kenyon

[57] ABSTRACT

A method for correcting a measuring error of a hot-film air-mass meter occurring as the result of backflow, in particular for acquiring the air mass of the combustion air of an internal-combustion engine. It is proposed for an errorfree acquisition that the air volume be measured with the hot-film air-mass meter as a first value (23) and further as a second value 24 with a second method for determining air volume (α/n method), which works independently of the hot-film air-mass meter; that the two values (23, 24) be drawn upon alternatively as a valid variable dependent upon the operating ranges determining the measuring reliability; and that in at least one operating range which is free of backflow for a correction signal ($K_H$) to be extracted from a comparison of the first (23) and the second value (24) and used to correct the second value (24) in operating ranges showing backflow.

10 Claims, 3 Drawing Sheets

METHOD FOR CORRECTING THE MEASURING ERRORS OF A HOT-FILM AIR-MASS METER

FIELD OF THE INVENTION

The present invention relates to a method for correcting a measuring error of a hot-film air-mass meter occurring as the result of backflow.

BACKGROUND INFORMATION

Hot-film air-mass meters can be used to detect the air mass drawn in by internal-combustion engines. These meters have a heated element, which is situated in the air flow to be measured and is cooled in this manner. In particular, it is possible to use the heated element as part of an electric bridge circuit and to keep it at a constant overtemperature relative to the intake air temperature by means of a current flowing through this element. With this principle, the required heating current is a measure for the air mass drawn in by the engine. The pulsations of the intake air, which possibly occur in certain operating ranges of an internal-combustion engine, can cause the measuring result to be corrupted. This is particularly the case when a so-called backflow occurs, since the hot-film air-mass meter cannot distinguish the direction of flow.

It is generally known to provide a hot-film air-mass meter with an evaluation circuit, so that a backflow can be recognized using programming technology. A high computing power is required for this. The backflow is recognized from the evaluation of the signal waveshape.

Furthermore, when backflows occur, it is known to adjust the output signal from a hot-film air-mass meter with a correction value. In certain operating ranges, however, only a very inaccurate result is able to be attained.

SUMMARY OF THE INVENTION

In contrast, the method according to the present invention has the advantage that even when backflows occur, there is a high degree of accuracy in detecting the air mass and thus the load value of the internal-combustion engine. It is not necessary to evaluate the signal waveshape, which is relatively costly and requires an appropriate computing capacity. Rather, the air mass measured with the hot-film air-mass meter is defined as a first value and compared to a second value, which is determined using another independently working method for determining air volume. Dependent upon the operating range existing at the time, either one or the other value is drawn upon as a valid variable that determines the air mass. Preferably, the air mass is determined per stroke of the internal-combustion engine, which, in the case of the internal-combustion engine provided with an injection system and stoichiometric combustion, is proportional to the injection time of the injection valves bringing in the fuel. In order to always be able to adapt individually to the conditions existing at the time, in accordance with the present invention, a correction signal is extracted in at least one backflow-free operating range from a comparison of the first and the second value and used to correct the second value in operating ranges that have backflow. Thus, the present invention involves applying the value acquired by the hot-film air-mass meter in certain operating ranges and, in other operating ranges in which the value acquired by the hot-film air-mass meter is inaccurate, working with another value that had been determined on the basis of a different method for determining air volume, whereby errors occurring with the mentioned method for determining air volume are corrected using an adaptation method. The correction signal which enables the adaptation is extracted thereby by comparing the first and the second value in an operating range which is free of backflow. The invention therefore makes use of the realization that no backflow occurs in certain operating ranges, so that the hot-film air-mass meter supplies correct data. These data constitute the basis, namely a calibration value, for the result determined according to the second method for determining air volume. In this respect, in ranges in which the hot-film air-mass meter supplies results which are inaccurate due to backflow, a very high accuracy is achieved by means of the adaptation according to the present invention with a method for determining air volume which functions on the basis of other principles.

A further development of the present invention provides for the correction signal to be an altitude-correction signal. Therefore, the measuring result of the second method for determining air volume is dependent on altitude, so that a correction must be made in order to avoid measuring errors. By using the altitude correction, one obtains the air mass from the air volume that is determined.

Preferably, in the case of the second method for determining air volume, the throttle-valve angle and the rotational speed of the internal-combustion engine are drawn upon and subjected to an engine-characteristics-map and/or algorithm processing to determine the second value.

Preferably, the measured value of the hot-film air-mass meter is applied as a valid variable in no-load operation, when the throttle-valve angles are small, and when the rotational speed is high. The operating ranges assumed in this case guarantee an error-free measuring result for the hot-film air-mass meter. With regard to the mentioned high rotational speed, it can be said that for rotational frequencies higher than approximately 3000 per minute, backflow no longer occurs. This limiting speed is dependent on the particular geometry of the suction pipe. Since also the pressure of the suction pipe at rotational speeds of <3000 per minute, already at a relatively small throttle-valve angle, no longer increases when the throttle valve is further opened and, moreover, the thus characterized limiting angle is still a function of the rotational speed, this relatively complicated correlation shall be described by a characteristic curve (limiting characteristic curve). This is determined in that a limiting angle exists, which preferably corresponds to 95% of the full load, that is, of the maximum suction-pipe pressure. If the throttle-valve angle existing at the moment is smaller than the limiting value which can be drawn from the engine characteristics map for the rotational speed existing at the moment or can be calculated using the algorithm, then an operating range exists for the internal-combustion engine in which no backflow can occur. Consequently, the measured value of the hot-film air-mass meter is applied as a valid variable in these operating ranges. However, if the throttle-valve angle is larger and the internal-combustion engine is in a rotational-speed range which lies below the mentioned limiting speed, then the engine is in a full-load useful range, in which backflow is possible. In this range then, according to the present invention, it is not the measured value of the hot-film air-mass meter which is applied as a valid variable, but rather the measured value of the second method for determining air volume in view of the depicted adaptation.

In summarizing, it can be said, therefore, that the measured value of the hot-film air-mass meter is retrieved as the valid variable in the case of working points which lie below the limiting characteristic curve of the throttle-valve angle/rotational speed diagram, whereby the limiting characteristic curve lies preferably in the upper load range, in particular in the range between 60 and 95% of the full load. Furthermore, the measured value of the hot-film air-mass meter is used as a valid variable for rotational speeds which lie above a limiting speed of preferably 3000 revolutions per minute.

Since slight changes in very small throttle-valve angles bring about very large changes in the volumetric flow in the suction pipe, this operating range is not suited for generating the correction signal and therefore is not suited for the adaptation. As a result, the adaptation is preferably not carried out in the mentioned range.

If the no-load setting of the internal-combustion engine is achieved by means of a by-pass controller, the second value is corrected by the amount of the no-load partial-air mass, which was not determined by the throttle-valve angle. This is the only way an error-free result can be attained.

To generate the correction signal, the difference between the values determined by the various methods for determining air volume is transmitted to an integrator, whose output value is fed to a multiplier as a first input quantity, whereby the second input quantity of the multiplier is the second value determined according to the second method for determining air volume. So long as there is a difference between the two values, the integrator is "integrated up or down" accordingly.

A further development of the present invention provides for a dynamic transition compensation variable to be produced from the corrected second value and superimposed on the valid variable. This transition compensation has the task of compensating for the time delay occurring when fuel is transported caused by dynamic quantities of additional or less fuel. The time delay comes about because the fuel volume injected into the suction pipe does not arrive directly in the corresponding cylinders of the internal-combustion engine, but is first "caught" on the inner wall of the suction pipe. Only in the course of subsequent work cycles of the internal-combustion engine is the correct fuel volume regulated in the cylinder, corresponding to the existing working point of the internal-combustion engine. The deficiency or excess occurring during the transition performance is compensated for by the dynamic transition compensation.

Figure 1:
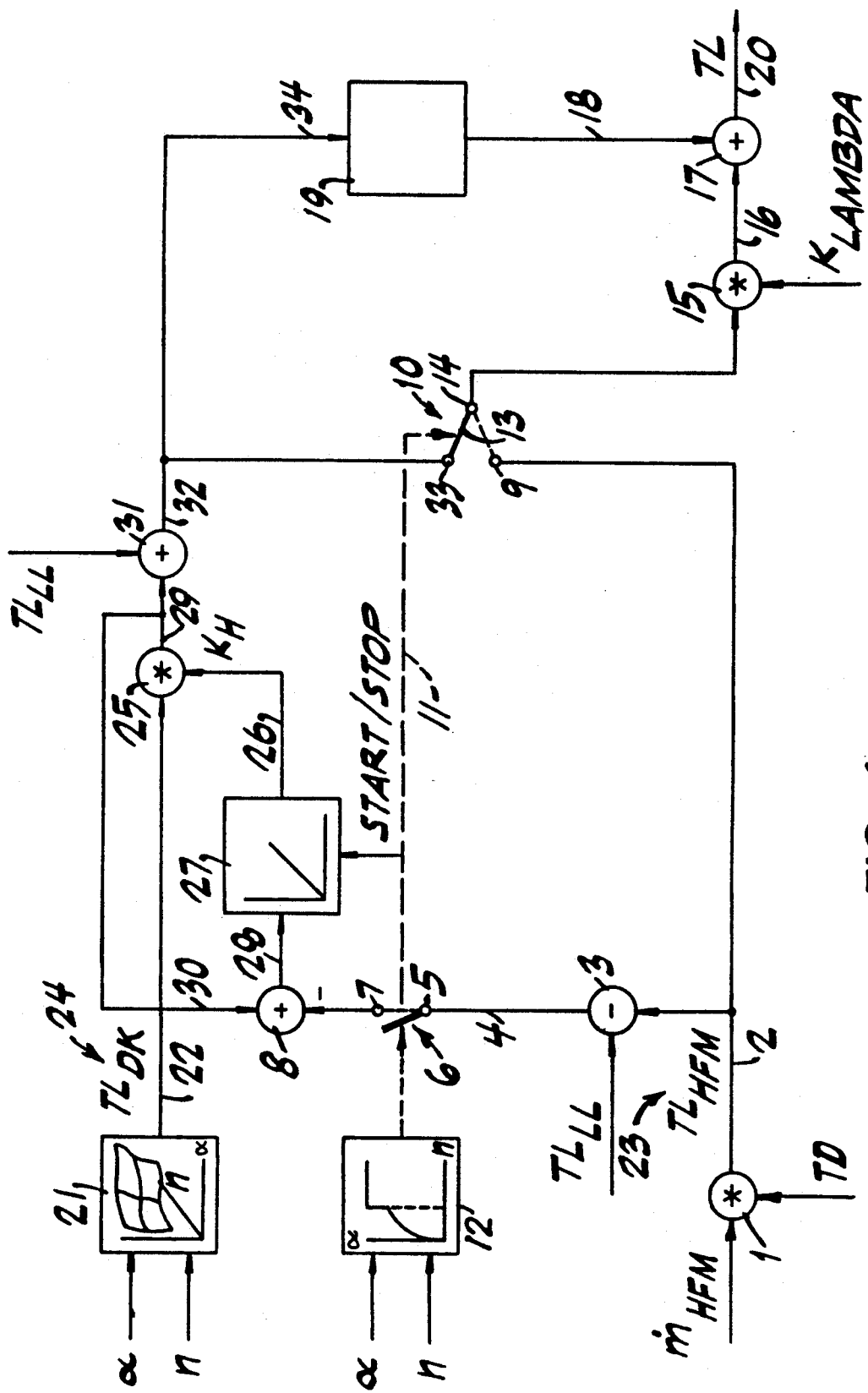
FIG. 1 shows a block diagram of a circuit arrangement for the method according to the present invention.

According to FIG. 1, the air mass $m_{HFM}$ detected per unit time by the hot-film air-mass meter not depicted) is supplied to a multiplication point 1, where the cycle duration TD of a suction period of an internal-combustion engine is applied as a further input signal. The injection time $TL_{HFM}$ determined by the hotfilm air-mass meter is available with the output quantity 2 of the multiplication point 1 and it corresponds to a specific fuel mass per stroke. Assuming a stoichiometric combustion, the injection time $TL_{HFM}$ is proportional to a corresponding air mass per stroke. The injection time $TL_{HFM}$ is fed to a subtraction point 3, which is furthermore supplied with a no-load injection time $TL_{LL}$. This no-load injection time $TL_{LL}$ corresponds to a specific air volume per stroke, which must be made available in a by-pass situated parallel to the throttle valve for the no-load adjustment (compare FIG. 5).

The initial value 4 of the subtraction point 3 is fed to a pole 5 of a circuit element 6. The other pole 7 of the circuit element 6 is connected to a summing point 8.

Furthermore, the initial variable 2 corresponding to the injection time $TL_{HFM}$ is connected to a pole 9 of a changeover switch 10, which can preferably be actuated at the same time as the circuit element 6 by means of an operative connection 11. The actuation is achieved by a control circuit 12, which shall be clarified in greater detail in the following.

A pole 14 of the changeover switch 10 which has a changeover contact 13 is connected to a multiplication point 15, which receives a correction factor $K_{Lambda}$ obtained from a Lambda feedback control as a further input quantity. Thus, in the case of the internal-combustion engine, when Lambda is not equal to one, that means that a non-stoichiometric combustion exists. This is then allowed for by the correction factor $K_{Lambda}$.

The output 16 of the multiplication point 15 is connected to a summing point 17 to supply an input quantity. As a second summand, the summing point 17 receives an initial value 18 from a transition-compensation circuit 19. The injection time TL is available at the output 20 of the summing point 17.

The throttle-valve angle $\alpha$ and the rotational speed n (actual rotational speed) of the internal-combustion engine are fed to an engine characteristics map 21, which supplies an injection time $TL_{DK}$ as an output quantity 22, which is dependent upon the throttle-valve angle $\alpha$ and the rotational speed n. The injection time $TL_{DK}$ determined in this manner is proportional to a corresponding air volume per stroke. Therefore, the air mass or air volume is acquired using two different methods; on the one hand with the already described hot-film air-mass meter, which measures air mass and, on the other hand, by means of the throttle-valve-angle rotational-speed engine characteristics map 21, which makes it possible to determine the air volume. The air mass corresponding to the injection time $TL_{HFM}$ represents a first value 23 and the air volume corresponding to the injection time $TL_{DK}$ represents a second value 24. While in the case of the hot-film air-mass meter, the density of the air is allowed for in principle, this is not the case with the α/n method. Thus, as already explained, the actual air mass is acquired with the hot-film air-mass meter. However, only the air volume is acquired with the α/n method, and this air volume must be corrected for altitude (corrected for density) to determine the air mass.

The injection time $TL_{DK}$ is fed to a multiplication point 25. An initial value 26 of an integrator 27, which is connected by its input to an output 28 of the summing point 8, is supplied as a further factor to the multiplication point 25. The output 29 of the multiplication point 25 leads to a further input 30 of the summing point 8. Since the signal coming from the multiplication point 25 is fed with a positive sign and the signal coming from the circuit element 6 is fed with a negative sign to the summing point 8, the difference between the two signals is available at the output 28.

Furthermore, the output 29 of the multiplication point 25 leads to a summing point 31, which receives the already mentioned injection time $TL_{LL}$ as a further input quantity. The output 32 of the summing point 31 leads to a pole 33 of the changeover switch 10. In addition, the output 32 is connected to an input 34 of the transition-compensation circuit 19.

Figure 2:
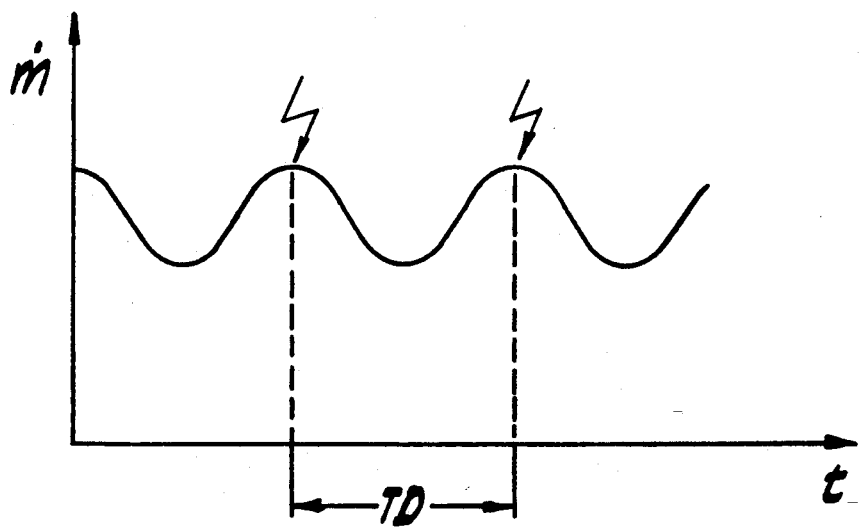
FIG. 2 shows a diagram which clarifies the temporal action of the air flow existing in the suction pipe of an internal-combustion engine.

FIG. 2 depicts the air flow in the suction pipe of the internal-combustion engine as a function of time. One can clearly recognize that the air mass pulsates per unit time (m). This means that there is no continuous flow. The pulsation is a reaction to the working cycles of the internal-combustion engine which do not follow continuously, but rather in cycles. The cycle duration TD of one suction period lies between every two points of ignition.

Figure 3:
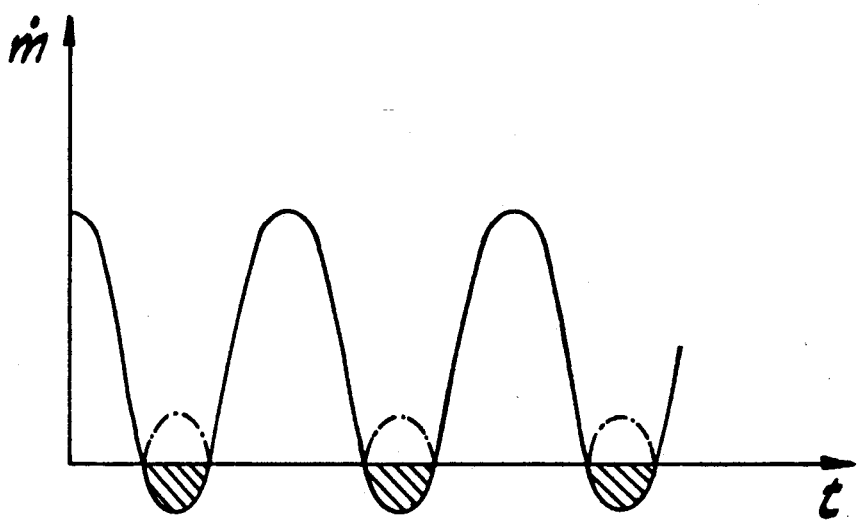
FIG. 3 shows a diagram corresponding to FIG. 2 with an air flow which pulsates heavily and exhibits backflow.

In certain operating ranges of the internal-combustion engine, the pulsation can become so great that backflow occurs. This means that the air-mass current reverses its direction in the suction pipe. The backflow is shown as the shaded area in FIG. 3. Since the hot-film air-mass meter cannot detect the direction of flow, the air mass flowing back is also detected as positive, so that a measuring error occurs. The hot-film air-mass meter measures the shaded areas in FIG. 3 as air masses supplied to the internal-combustion engine; this is indicated by a dot-dash line in FIG. 3. The errors occurring in this respect as a result of the hot-film method for detecting air volume are eliminated by the method according to the present invention, which is clarified in greater detail in the following.

Figure 4:
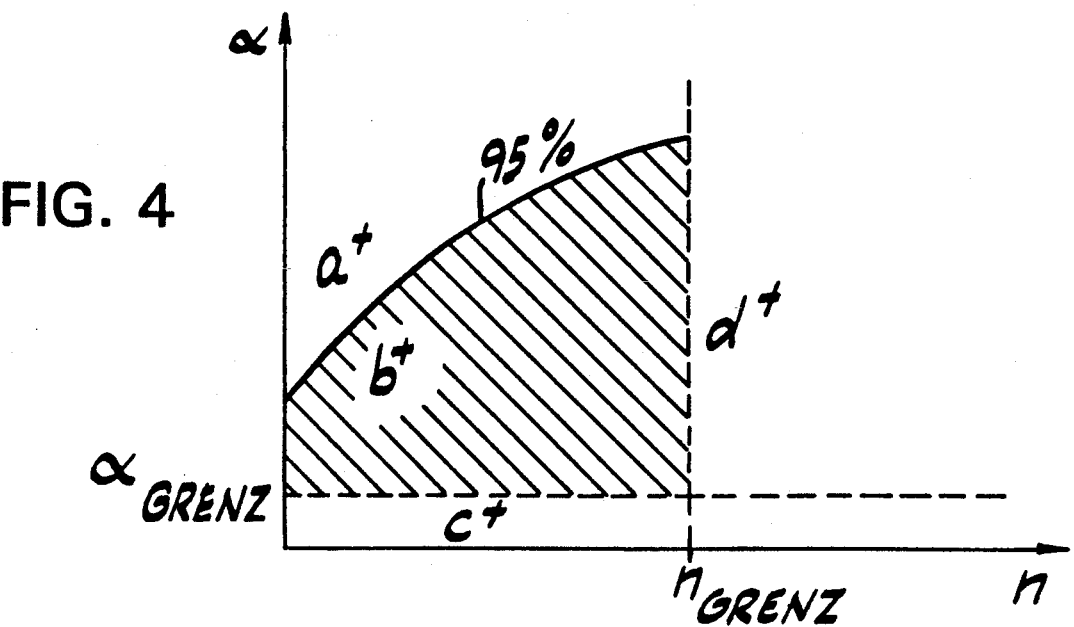
FIG. 4 shows a throttle-valve-angle/rotational speed diagram with a 95% full-load limiting characteristic curve.

The control circuit 12 actuating the circuit element 6 and the changeover switch 10 through the operative connection 11 has a limiting characteristic curve in accordance with the diagram of FIG. 4. The throttle-valve angle α is plotted on the ordinate of the diagram and the rotational speed n of the internal-combustion engine is plotted on the abscissa. The load of the internal-combustion engine is dependent upon the throttle-valve angle α to such an extent that already at relatively small throttle-valve angles α for small rotational speeds, the suction-pipe pressure no longer increases when the throttle valve is further opened up. Moreover, the throttle-valve angle α is still a function of the rotational speed n. The characteristic curve of FIG. 4 describes the rotational-speed dependency of a limiting angle, which is fixed so that its setting corresponds to 95% of the full load. In addition, the diagram of FIG. 4 shows a rotational-speed boundary line $n_{Grenz}$ and a throttle-valve-angle boundary line $α_{Grenz}$. The present invention makes use of the fact that no backflow occurs in the shaded area in FIG. 4. This means that to acquire the injection time TL or the air mass per unit time, the measured value (first value 23) acquired by the hot-film air-mass meter can be used. The mentioned area lies below the 95% limiting characteristic curve and is defined by the rotational-speed boundary line $n_{Grenz}$ and the throttle-valve-angle boundary line $α_{Grenz}$. Working points which lie above the 95% limiting characteristic curve (such as the working point a) require an air-mass acquisition that is not carried out by the hot-film air-mass meter, because measuring errors occur. In this case, the just-mentioned second method for determining air volume is employed. The acquisition of the throttle-valve angle and the rotational speed, as well as the engine characteristics map 21, aid in carrying out this method. Therefore, a $TL_{DK}$ injection-time acquisition is undertaken for the mentioned working point.

The working point b sketched in FIG. 4 lies within the shaded area. Since no backflow occurs here and consequently the hot-film air-mass meter works in an error-free manner, the air mass can be acquired by means of the hot-film air-mass meter. For working points which show a very small throttle-valve angle (working point c in FIG. 4), it applies that very small changes in the throttle-valve angle α already lead to relatively large changes in the volumetric air flow. This presupposes angle-setting detectors of an especially high quality for the throttle valve, which in addition must work in a manner that is free from play and is therefore very expensive. Since an inexpensive solution is aspired to with the method according to the present invention and, therefore, the throttle-valve setting is accomplished with a standard potentiometer, this throttle-valve angular dimension is not used to adapt the injection time $TL_{DK}$, as described in the following in greater detail. On the other hand, however, the air mass is acquired with the hot-film air-mass meter within the range of small throttle-valve angles α existing here and, in particular, within the no-load range as well.

No backflow is possible in the case of rotational speeds which lie above the rotational-speed boundary line $n_{Grenz}$. In this respect, the acquisition of air mass is achieved within this range by means of the hot-film air-mass meter.

The control circuit 12 actuates the circuit element 6 and the changeover switch 10, depending on the position of the working point existing at the moment, in a way that enables the air mass to be acquired by the hot-film air-mass meter in the operating range which is free of backflow. When backflow occurs, thus at working points which lie above the 95% limiting characteristic curve, the other, second method for determining air volume is drawn upon for acquiring the air volume, or rather for acquiring the injection time $TL_{DK}$ in proportion to the acquisition of the air volume. This second method works with the throttle-valve angle α and the rotational speed n, as well as the engine characteristics map 21. The switch positions of the circuit element 6 and of the changeover switch 10 depicted with a dotted line in FIG. 1 correspond to an operation in which the hot-film air-mass meter is employed. The initial value of the hot-film air-mass meter $(m_{HFM})$ is multiplied at the multiplication point 1 by the cycle duration TD of one suction period, and the thus formulated injection time $TL_{HFM}$ is fed via the changeover switch 10 to the multiplication point 15. In this case, a multiplication is carried out with the correction factor $K_{Lambda}$, which is obtained from the Lambda feedback control, as already mentioned. The value which is available at the output 16 of the multiplication point 15 is then transmitted via the summing point 17 to the output 20. Accordingly, the injection time TL determined in this manner is based on the measurement of the hot-film air-mass meter.

Since the circuit element 6 is in a closed state in the previously described operating range, the injection time $TL_{HFM}$ is further conveyed via the subtraction point 3 to the summing point 8. The throttle-valve angle $\alpha$ existing in the specific working point of the internal-combustion engine, as well as the corresponding rotational speed n, are likewise sent via the engine characteristics map 21 and the multiplication point 25 to the summing point 8. Consequently, the first value 23 ($TL_{HFM}$) is compared to the second value 24 ($TL_{DK}$) at the summing point 8. These two values are compared in order to generate a correction signal $K_H$ at the output of the integrator 27. This correction signal $K_H$ allows for the influence of altitude to which the load ($TL_{DK}$) of the $\alpha/n$ engine characteristics map is subjected. If one did not make this altitude correction, then the second value 24 would be inaccurate. The error amounts to about 10% per 1000 meters of altitude.

The altitude correction takes place according to an adaptive method of the present invention. This means that for operating ranges in which no backflow occurs, the first value 23 is constantly compared to the second value 24, and the correction signal $K_H$ is determined from this comparison. If an operating range encumbered with backflow is subsequently started by the internal-combustion engine, then on the one hand the control circuit 12 switches over the circuit element 6 as well as the changeover switch 10 in a way that enables the transition to be made from the acquisition of the air mass using the hot-film air-mass meter to the $\alpha/n$ acquisition. Therefore, the circuit state exists as represented by the contacts depicted with a solid line in FIG. 1. The injection time $TL_{DK}$ is supplied in this case to the multiplication point 25 and adaptively corrected accordingly by means of the correction signal $K_H$. The no-load correction takes place then still at the summing point 31. The thus determined injection time is transmitted via the changeover switch 10 to the multiplication point 15. The Lambda correction is made there and finally the injection time TL is available at the output 20. The result of the adaptation is that in the case of the correction signal $K_H$, one works with a value which was determined shortly before switching over from hot-film air-mass-meter operation to $\alpha/n$ operation. Therefore, a system is obtained which adapts to the actual conditions and compensates for altitude errors.

An exception can be made in so far as the adaptation is prevented for operating ranges with a very small throttle-valve angle $\alpha$, since, as already described, this would require a high-resolution potentiometer to detect the throttle-valve setting. In this embodiment, therefore, the circuit element 6 is not rigidly coupled to the changeover switch 10, rather the circuit element 6 is switched separately, independently of the circuit state of the changeover switch 10.

Figure 5:
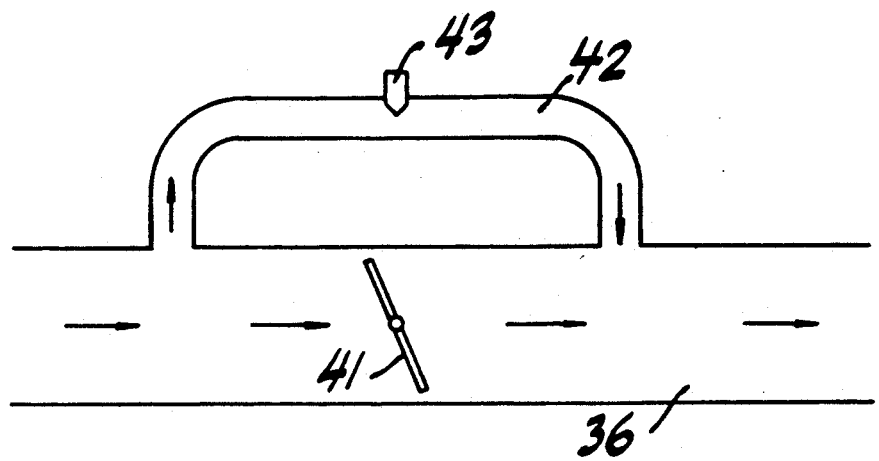
FIG. 5 shows a schematic representation of a suction pipe with a no-load, by-pass.

FIG. 5 shows a section of the suction pipe 36 that contains the throttle valve 41. The throttle valve 41 is bridged over by a by-pass 42 with a by-pass controller 43, so that the no-load adjustment can be made for the internal-combustion engine in this manner. In this respect, the hot-film air-mass meter configured in the vicinity of the throttle valve 41 cannot acquire the partial volume of air passing through the by-pass 42. Therefore, according to FIG. 1, the configuration according to the present invention makes a corresponding correction ($TL_{LL}$).

Figure 6:
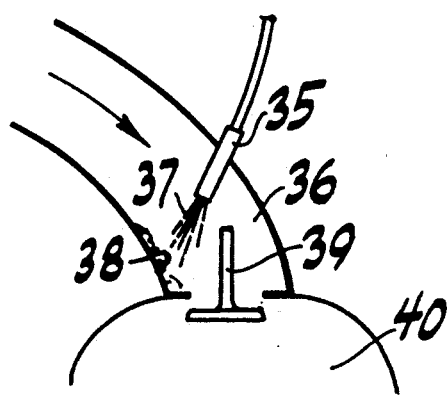
FIG. 6 shows a schematic representation of the cylinder-head area of a cylinder of the internal-combustion engine.

It is further apparent from FIG. 1 that the injection time value ($TL_{DK}$) corrected by the altitude-dependent adaptation is supplied via the summing point 31 to the transition-compensation circuit 19 independently of whether the first method for determining air mass (hot-film air-mass meter) or the second method for determining air volume ($\alpha/n$ method) is in use. The output value 18 from the transition-compensation circuit 19 is always added to the value from the output 16 of the multiplication point 15 with the help of the summing point 17 to generate the injection time TL (output 20). However, an output value 18 occurs only in the case of dynamic transitions, that is, when an appropriate transition correction is required with respect to the supplying of air volume because of fuel variation quantities "getting caught" with time delay at the wall of the suction pipe. FIG. 6 illustrates the time delay for the fuel. The fuel 37 brought in from the injection valve 36 depicted there into the suction pipe 35 remains partially as a coating 38 on the inner wall of the suction pipe and enters only with a time delay through the intake valve 39 into the cylinder 40.

In the ranges in which the hot-film air-mass meter is drawn upon to determine air mass, the method according to the present invention has the advantage of high accuracy, so that the load value can also be defined very accurately. An altitude error does not occur in this case. When backflows occur, the second method for determining air volume is provided, which is adaptively corrected for altitude (density correction). Here, to measure the throttle-valve angle $\alpha$, a simple, single-track potentiometer can be used. Its accuracy suffices because the injection time $TL_{DK}$ is retrieved as a valid quantity only in those operating states in which large volumes of air are relocated. Thus, the requirements for the resolution and the linearity of the potentiometer that is used can be reduced.

Besides this, the described transition compensation is made with $TL_{DK}$ values. They are provided considerably faster than the values from the hot-film air-mass meter, as this measuring instrument possesses a certain inertia. One thus obtains a transition compensation that has a very short reaction time.

What is claimed is:

1. A method for determining the air mass flowing into an engine, comprising:
   measuring a first value of the air mass with an air-mass meter;
   determining a second value of the air mass independently of the air-mass meter;
   comparing the first value to the second value during a backflow-free operating range of the engine to determine a correction signal based thereon; and
   adjusting the second value based on the correction signal during an operating range of the engine in which backflow occurs.

2. The method according to claim 1, wherein the correction signal is selected from a group including an altitude-correction signal and a temperature-correction signal.

3. The method according to claim 1, wherein the step of determining the second value includes the step of supplying a throttle-valve angle and a rotational speed of the engine to an engine-characteristics-map or algorithm-processing unit.

4. The method according to claim 1, wherein the first value is treated as the actual air mass in no-load operation of the engine.

5. The method according to claim 1, wherein the first value is treated as the actual air mass when a throttle-valve angle is small and when a rotational speed of the engine is high.

6. The method according to claim 1, wherein the first value is treated as the actual air mass when a throttle-valve angle is smaller than a limiting angle.

7. The method according to claim 1, wherein the first value is treated as the actual air mass when a rotational speed is higher than approximately 3000 revolutions per minute.

8. The method according to claim 1, wherein the second value is adjusted based on a no-load partial air mass if a by-pass controller is utilized.

9. The method according to claim 1, further comprising the steps of:
   integrating a difference between the first value and the second value; and
   multiplying the second value by the integrated value.

10. The method according to claim 1, further comprising the steps of:
   determining a dynamic transition-compensation value based on the adjusted second value; and
   adding the dynamic transition-compensation value to a value selected from a group including the first value and the second value.

* * * * *